United States Patent [19]

Lagerström et al.

[11] Patent Number: 4,557,918
[45] Date of Patent: Dec. 10, 1985

[54] METHOD FOR PRODUCING SILICA

[75] Inventors: Gösta B. Lagerström; Lennart H. A. Berglund, both of Helsingborg, Sweden

[73] Assignee: Boliden Aktiebolag, Stockholm, Sweden

[21] Appl. No.: 525,312

[22] Filed: Aug. 22, 1983

[30] Foreign Application Priority Data

Oct. 13, 1982 [SE] Sweden ................................ 8205825

[51] Int. Cl.⁴ .............................. C01F 7/02; C01F 7/50
[52] U.S. Cl. ...................................... 423/335; 423/340
[58] Field of Search ....................... 423/328, 332–335, 423/488, 131, 132, 340

[56] References Cited

U.S. PATENT DOCUMENTS

| | | | |
|---|---|---|---|
| 1,858,100 | 5/1932 | McAdoo | 423/132 |
| 2,657,149 | 10/1953 | Iler | 423/335 |
| 3,175,882 | 3/1965 | Derr | 423/116 |
| 3,511,605 | 5/1970 | Smith et al. | 423/335 |
| 3,551,322 | 12/1970 | Baumann et al. | 210/915 |
| 4,028,237 | 6/1977 | Nishimura et al. | 210/45 |
| 4,320,012 | 3/1982 | Palm et al. | 210/915 |

FOREIGN PATENT DOCUMENTS

| | | |
|---|---|---|
| 314474 | 4/1974 | Austria . |
| 315128 | 5/1974 | Austria . |
| 2122647 | 11/1972 | Fed. Rep. of Germany . |
| 2612745 | 10/1976 | Fed. Rep. of Germany . |
| 2103484 | 4/1972 | France . |
| 51-96159 | 8/1976 | Japan .................................. 210/915 |
| WO83/2444 | 7/1983 | PCT Int'l Appl. . |
| 366723 | 6/1974 | Sweden . |
| 7502835 | 7/1979 | Sweden . |
| 8100218 | 1/1981 | Sweden . |

OTHER PUBLICATIONS

Philadelphia Quartz Company; *P.Q. Silicates of Soda* Bulletin No. 172, pp. 1 to 8 (1941).
WO 82/02538, PCT/SE82/00004, International Filing Date 1/11/82.

*Primary Examiner*—Christopher W. Brody
*Attorney, Agent, or Firm*—Brumbaugh, Graves, Donohue & Raymond

[57] ABSTRACT

The present invention relates to a method for purifying silica waste obtained in the manufacture of aluminium fluoride from hexafluosilicic acid and aluminium hydroxide, whereby the silica, is subjected to an acidic leaching at a pH below 3 to leach out part of the fluorine and substantially all the aluminium present in said waste, and is thereafter subjected to an alkaline leaching at pH 8.5–11.5 to leach out remaining fluorine present in said waste. The leachings are preferably carried out at elevated temperatures, normally 60°–90° C., and for a time sufficient to considerably reduce the contents of aluminium and fluorine, normally 1–3 hrs.

The silica obtained is highly reactive and can be used as such or transformed into sodium silicate by a reaction with sodium hydroxide. The contents of fluorine and aluminium can be transferred to a process for the production of cryolite or similar compounds.

9 Claims, 1 Drawing Figure

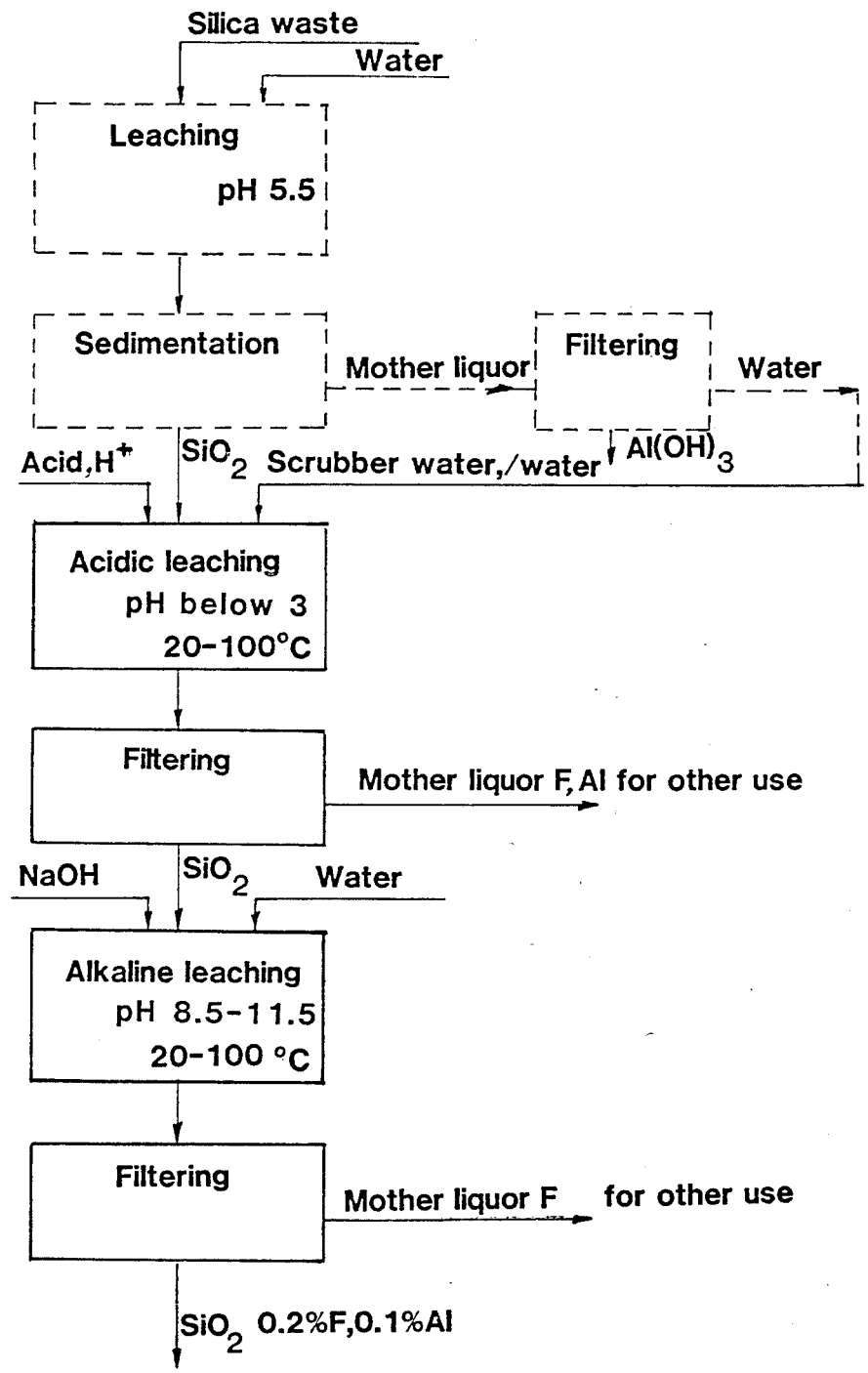

METHOD FOR PRODUCING SILICA

DESCRIPTION

TECHNICAL FIELD

The present invention relates to a method for purifying silica from waste products obtained when producing aluminium fluoride from aluminium hydroxide and fluosilicic acid, and more particularly to high-grade silica with regard to purity concerning contaminations of aluminium and fluorine.

An object of the present invention is to obtain a possibility of recovering pure silica from the waste products obtained in the aluminium fluoride production which silica can be used as such, or in the production of silicoaluminates, or in the production of other silicon compounds such as sodium silicate ($Na_2O \cdot nSiO_2$; ($n \leq 5$), waterglass).

BACKGROUND OF THE INVENTION

When manufacturing aluminium fluoride from aluminium hydroxide and fluosilicic acid, several troublesome waste products are obtained which must be deposited and, optionally, rendered harmless. Thus, there is obtained a silica waste which contains fluorine and aluminium impurities, and a mother liquor and a scrubber water containing fluorine, aluminium and silicon. These waste products present a serious problem, since they occur in relatively large quantities and require expensive treatment before they can be deposited. It is true that silica residues per se can be deposited, but—as will be understood—the direct deposit of silica contaminated with large quantities of harmful impurities cannot be tolerated. The mother liquor and the scrubber water must be neutralized with calcium hydroxide to a pH-value of about 10, at which the aluminium, fluorine, and silicon contents thereof precipitate. This precipitate is then separated from the remaining aqueous solution for example by centrifugation, and subsequently deposited.

Thus, the aforementioned waste products constitute a serious environmental problem, but can be rendered harmless, however, to high costs. In addition, substantial amounts of silicon, aluminium, and fluorine are lost when the waste is treated in said manner.

The reactions involved in the production of aluminium fluoride are given below, the waste products being underlined.

1.

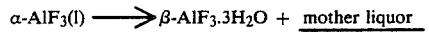

2.

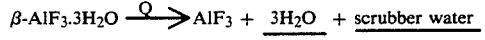

3.

Prior art recognizes some different methods for recovering active silica and cryolite as well as other compounds from fluosilicic acid and waste products from the preparation of aluminium fluoride.

Using fluosilicic acid and ammonia as starting materials active silica and cryolite can be prepared (AT, B, 315128). Thereby ammonium fluoride and silica are primarily prepared, whereafter the ammonium fluoride is reacted with sodium aluminate to the formation of cryolite.

SE,B, No. 366723 relates to a process to recover fluorine and aluminium from dilute, aqueous solutions, particularly mother liquors obtained in the crystallization of aluminium fluoride, whereby the mother liquors are treated with ammonia, or ammonium dicarbonate to give a chiolite-analogous ammonium compound, $(NH_4)_5Al_3F_{14}$. The precipitation of said compound is carried out at pH 6–6.5.

SE,B No. 7502835-7 relates to a concentrated synthetic fluxing agent based on calcium fluoride, where remaining fluorine quantities from the production of aluminium fluoride from fluosilicic acid and aluminium hydroxide are precipitated using a calcium compound.

In accordance with SE,A, No. 8100218-0 a method for recovering useful products from waste of the described form is disclosed, whereby silica obtained in the manufacture of aluminium fluoride and contaminated with, inter alia, fluorine and aluminum, is dissolved in a strongly basic hydroxide; mixing the first solution obtained with a second solution obtained by dissolving aluminium hydroxide with a strongly basic hydroxide, and with waste mother liquor and optionally also scrubber water from the manufacture of aluminium fluoride in such proportions that the pH-value of the mixture lies between about 10 and 14, the silica content of the waste products supplied being precipitated as a silicoaluminate, which is separated off, preferably by filtration, for optional further treatment or for direct use, whereafter fluorine, if present in the waste products, is recovered from the filtrate by adding thereto an aluminium compound in an amount sufficient to precipitate substantially all the fluorine content contained in the filtrate as a fluoroaluminate, which is separated off, preferably by filtration, for further use, and whereafter the final filtrate is passed to a recipient or utilized, for example, as process water in other processes.

Another method for recovering useful products from waste of the described type is disclosed in SE,A No. 8200045-6, whereby alkali metal ions are added in the form of an alkali metal salt to collected mother liquors and scrubber water obtained in the manufacture of aluminium fluoride and being contaminated with aluminium, silica, and fluorine, and by adjusting the hydrogen ion concentration of said mother liquors and scrubber water to a pH of 2.0 to 5.0, preferably 2.0 to 3.0 by adding an alkali metal base while maintaining a temperature of said collected solutions of above about 50° C., isolating the alkali metal fluoroaluminate thereby precipitated by filtration, whereafter the filtrate comprising silica and minor amounts of aluminium and fluorine is passed to a second step for the recovery of one or more of said compounds.

Thus, the useful product produced in the first stage is a fluoroaluminate, preferably a sodium fluoroaluminate also named cryolite. This means that in a second step the silica contents of the waste products, i.e. precipitated $SiO_2$, according to formula I page 2, and the filtrate from step one above, can be recovered in the form of a silicoaluminate, preferably sodium silicoaluminate, thereby the silica is primarily dissolved and reacted with sodium hydroxide to sodium silicate and reacted with an aluminium salt. Such products as sodium fluoroaluminate (cryolite), and sodium silicoaluminate can be used directly, and are requested by the market. Thus, sodium silicoaluminate can be used as a pigment agent in the paper-making industry and in the rubber and paint industries. Sodium fluoroaluminate or cryolite is mainly used as a fluxing agent when producing aluminium electrolytically.

Under normal conditions, however, it has turned out to be too high contaminations of aluminium and particularly fluorine in the silica waste used for the production of silicoaluminates, whereby it has been requested to eliminate these impurities from the silica waste prior to the use of the silica, the contamination of aluminium i.a. being detrimental to the production of waterglass from silica.

It has also been shown that when using sodium silicoaluminate as a pigment agent in the production of paper the residual fluorine content has a great impact on conventional sizing, determined as the Cobb-value, whereby a fluorine content of 2% in the pigment gave a Cobb-value of 93 and a fluorine content of 1% gave a Cobb-value of 45 with the same wood pulp composition, i.e. a more than 50% increase in that range.

Further a content of fluorine present in the silica when producing a sodium silicate from said silica and sodium hydroxide, will render the latter reaction hard to control.

Carrying out the method according to SE No. 8100218-0 a sodium aluminium silicate is obtained which is rather alkaline and will thereby require a high demand of alum when used as a paper filler.

In accordance with SE,A, No. 8200045-6 purification can be made by suspending the silica waste in sulphuric acid, heating the mixture, whereby fluorine and silicofluoride are driven off, absorbed and passed on to the precipitation step of fluoroaluminate, and the silica is suspended in water for dissolving any aluminium sulphate present. The slurry thus obtained is then passed to a filtration step, where the solid and now pure silica is separated off and passed on to the dissolver for production of sodium silicate and the aluminium sulphate solution containing sulphuric acid is passed to the precipitation step of sodium aluminium silicate.

This method for purification is, although convenient, not so far reaching as requested in order to eliminate the fluorine and aluminium contents. Moreover this method is very energy consuming and costly with regard to apparatuses involved.

DISCLOSURE OF THE PRESENT INVENTION

The present invention relates to a surprisingly distinctive method for recovering a useful pure silica and subsequently other products from said silica, while at the same time substantially eliminating the environmental problems created by the waste. The method according to the invention is of further economic interest, since, among other things, the waste need not be treated with calcium hydroxide, which in turn means lower costs.

The present invention is thus characterized in that silica being contaminated with aluminium and fluorine is provided in a first, aqueous slurry, with hydrogen ions to a final pH of below 3 and leached at a temperature of 120°-100° C., preferably while stirring for a time sufficient to leach out substantially all aluminium and part of fluorine present, whereupon the insoluble silica is isolated and optionally, washed with water and then slurried in a second, aqueous slurry whereupon hydroxyl ions or hyroxyl ions forming compounds are provided to a pH of 8.5-11.5 and the silica is further leached at a temperature of 20°-100° C. for a time sufficient to leach out remaining fluorine, whereupon, finally, pure silica is isolated and washed with water.

Further chracteristics of the invention are set forth in the accompanying claims.

The pure silica obtained, which has a high reactivity, and thereby being so reactive that sodium silicate with a molar ratio of $SiO_2:Na_2O$ of $>3:1$ can be produced, can be used as such, or be reacted with sodium hydroxide at a temperature of 90° C. at atmospheric pressure to the formation of sodium silicate, e.g. with a molar ratio of $SiO_2:Na_2O$ of $>3:1$ and high concentrations, i.e. 30-35% by weight of sodium silicates. The mother liquors obtained, i.e. an acidic, first mother liquor, and wash water and an alkaline, second mother liquor, and wash water, comprising fluorine and aluminium can be transferred to a process for recovering sodium fluoroaluminate, cryolite, from the waste material described above and disclosed in SE,A, No. 8200045-6.

The hydrogen ions are added in the form of sulphuric acid, hydrochloric acid, nitric acid, or hexafluosilicic acid, preferably sulphuric acid.

The aqueous alkaline solution used is made from any alkali metal base such as sodium hydroxide, sodium carbonate, potassium hydroxide, potassium carbonate, lithium hydroxide, whereby sodium hydroxide and sodium carbonate are particularly preferred.

The sodium silicate solution prepared from the silica obtained as mentioned above can e.g. be reacted with aluminium sulphate to form sodium aluminium silicate which, in fine particle size, can be used as a pigment agent in the paper-making industry and in the rubber and paint industries.

An exemplary, preferred embodiment of the process will now be described in more detail with reference to the accompanying drawing, the single FIGURE of which is a flow sheet of said embodiment.

EXAMPLE 1

800 g of waste $SiO_2$ from the production of aluminium fluoride from hexafluosilicic acid and aluminium hydroxide, which waste $SiO_2$ contained 27% of $H_2O$, 62.9% $SiO_2$, 1.97% Al, and 3.07% F, were added together with 50 ml of conc. $H_2SO_4$ and 2,000 ml of scrubber water from the same process, which scrubber water contained 0.6% F, 0.015% Al, 0.073% $SiO_2$, 0.0026% Ca and 0.00036% $P_2O_5$, to a reaction vessel, whereby the pH obtained was 0.6. The temperature was raised to 80° C. and the mixture was held at that temperature for 1 hr under agitation by stirring. The $SiO_2$ content was then filtered off and washed with water. The outgoing mother liquor contained 50% of the ingoing amount of F and substantially all aluminium and showed the following analytical data: 2 400 ml of liquor, pH 0.66, 21.2 g of F and 13.8 g of Al. Said mother liquor was passed to a process for the production of sodium fluoroaluminate, cryolite. The $SiO_2$ content, now having been filtered and washed, was passed to a further reaction vessel together with 75 ml of 46% NaOH and 1,000 ml of $H_2O$. This alkaline reaction mixture having a pH of about 11 was heated to and held at a temperature of about 80° C. for about 3 hrs, whereupon the reaction mixture was transferred to a filter where the $SiO_2$-content was isolated and washed. The alkaline mother liquor having a pH of 11 contained 4.9 g of Na per liter, 3.9 g of F per liter, and 0.58 g of $SiO_2$ per liter. The washed and pure $SiO_2$ now contained 92.5% of $SiO_2$, 0.26% of F and 0.42% of Al and balancing amounts of water as free and bound water. The alkaline mother liquor was passed to the abovementioned process for the production of cryolite.

The SiO$_2$ now being freed from F and Al was passed to a production step for sodium silicate, where the SiO$_2$ is reacted with NaOH in an aqueous solution at 90° C. Hereby it is possible to produce any grade of waterglass, i.e. any n below 5, in the formula Na$_2$O.nSiO$_2$ whereby particularly those having an n or about 3–4 are of high interest. Specifically 324 g of wet silica containing 180 g SiO$_2$(=3 moles) and 144 g of H$_2$O (free and bound water), 230 g of 46% NaOH containing 46.5 g of Na$_2$O and 83.5 g of H$_2$O, and 266 g of H$_2$O were reacted at 90° C. for 1 hr at atmospheric pressure, which gave a 31.4% solution of Na$_2$O .3SiO$_2$.

EXAMPLE 2

400 g of SiO$_2$-waste from the production of aluminium fluoride from hexafluosilicic acid and aluminium hydroxide, comprising i.a. 13.1 g of F and about 7.7 g of Al were added together with H$_2$SO$_4$ to final pH 2 and 1,000 ml of scrubber water comprising i.a. 6.0 g of F and 0.15 g of Al. Cf Example 1 above. The reaction mixture was treated in accordance with Example 1 above at pH 2, 60° C. and for 2 hrs, whereby a mother liquor of 1,200 ml comprising 12.2 g of F and 7.5 g of Al was produced. The silica waste was transferred to a further reaction vessel and provided with 50 ml of 46% NaOH and 500 ml of water, whereupon it was treated at pH 11 at 90° C. for 2 hrs. The silica, now purified, was isolated by filtration and the mother liquor obtained (830 ml) thereby contained 6.3 g of F. The residual silica contained 0.21 g of F and 0.1% Al.

EXAMPLE 3

400 g of silica waste from the production of aluminium fluoride from hexafluosilicic acid and aluminium hydroxide, comprising i.a. 13.1 g of F and about 7.7 g of Al were added to 1,200 ml of water and leached at 60° C. for 1 hr while stirring. The pH was about 5.5. The silica phase was isolated by sedimentation and the water phase containing a fine disperse solid was drawn off and filtered. The finely dispersed solid isolated consisted of aluminium hydroxide comprising 6 g of Al, which was dried. The water phase obtained after filtration was returned to the silica and pH was lowered to 0.6 by the addition of 50 ml of H$_2$SO$_4$. The reaction mixture was held at 60° C. for 2 hrs. The mother liquor of 1 200 ml comprising 7.1 g of F and 1 g of Al was isolated. The silica was transferred to a further reaction vessel and provided with 50 ml of 46% NaOH and 500 ml of water, whereupon it was leached at pH 11 at 80° C. for 2 hrs. The silica now freed from F and Al, was isolated by filtration and the mother liquor obtained thereby contained 5.8 g of F. The residual purified silica contained 0.21 g of F and 0.3 g of Al.

In the acidic leaching step described above water and/or scrubber water from the aluminium fluoride production can be used as aqueous medium. The mother liquor obtained in said production should not be used alone but in combination with water and/or scrubber water. Using the scrubber water and mother liquors aluminium and fluorine are in fact added, but these do not disturb the leaching steps. Said compounds are isolated after the leaching and added to any accompanying cryolite production, where they servce to increase the yield of cryolite, or otherwise used.

In the acidic leaching above the normal residual aluminium content will be 0.1% by weight in the slica obtained.

The silica thus produced can be used in the production of sodium silicate and sodium aluminium silicates from such waterglass, optionally after a further purification of the waterglass with active carbon for the adsorption of minor amounts of coloring agents, such as iron hydroxide.

The silica can also be used as a filtering aid and as an active column fillerin liquid-liquid chromatography. Further the silica can be used as a carrier for biocides. Silica is further a raw material in the production of silica glass (quartz glass).

Leaching silica waste the solid contents of the leaching mixture can be up to 30 to 40%, above which the stirring of the mixture is considerably complicated due to the high viscosity of the slurry.

EXAMPLE 4

Silica waste was used in the below comparative testing of the acidic leaching, whereby leachings at different temperatures was compared.

Two samples of 400 g wet silica waste (=315 g dry silica waste containing 2.80% of Al and 3.90% F) were each stirred in 1 000 ml of hexafluosilicic acid (25%) for 4 hrs at a temperature of 20° C. and 60° C., respectively. The suspensions were filtered on a suction filter and the respective filter cakes were washed with warm water, whereupon they were dried at 105° C. Analyses of the dried acid leached silica waste gave the results given in Table 1 below.

TABLE 1

| Leaching temperature | Leached, dried silica | |
|---|---|---|
| | Al % | F % |
| 20° C. | 1.60 | 3.37 |
| 60° C. | 0.17 | 3.47 |

As evident from above the leaching temperature is of great importance to give a good Al-purification.

EXAMPLE 5

A comparative acidic leaching study was carried out in order to determine the upper pH limit at which an acceptable aluminium elimination from the silica waste is obtained in acidic leaching. Thereby 6 samples of wet silica waste weighing 500 g each were used. Dry substance contents of the waste was 80%, and whereby aluminium content was 2.8% and the fluorine content was 3.9% calculated on dry waste product. The leachings were carried out at 80° C. for 6 hrs with an addition of sulphuric acid to different final pH-values in accordance with the Table 2 below.

After finished leaching the product samples were filtered whereby the filtration time was determined.

TABLE 2

| Addition of H$_2$SO$_4$ ml | Final pH | Filtration time sec | Leached, dried silica | | |
|---|---|---|---|---|---|
| | | | weight g | Al % | F % |
| 0 | 3.9 | 36 | 399 | 2.4 | 3.6 |
| 1 | 3.4 | 12 | 390 | 2.5 | 3.8 |
| 8 | 2.9 | 18 | 374 | 0.86 | 2.0 |
| 17 | 2.1 | 17 | 373 | 0.41 | 1.9 |
| 26 | 1.2 | 16 | 370 | 0.14 | 1.8 |
| 30 | 1.4 | 13 | 362 | 0.18 | 1.8 |

EXAMPLE 6

A comparative, alkaline leaching study was carried out in order to determine the impact of different pH-values (final pH-values) in the alkaline leaching as well as any possible impact of the type of alkali added. Thereby 5 samples, each weighing 500 g, of acid leached silica were used. The samples contained 42.7% of H₂O, i.e. 57.3% dry matter, whereby the fluorine content was 1.75% calculated on dry matter. The leachings were carried out at 80° C. for 4 hrs, with an addition of sodium carbonate and/or sodium hydroxide in the same equivalent amount of Na, which gave different final pH-values in accordance with Table 3 below.

TABLE 3

| Wet silica waste g | Water ml | Na₂CO₃ g | NaOH 45% ml | pH of filtrate 20° C. | F-content in leached silica % | Silica content in filtrate g/l | F eliminated from waste % |
|---|---|---|---|---|---|---|---|
| 500 | 1000 | 53.7 | 0 | 9.27 | 0.81 | 0.8 | 53.7 |
| 500 | 1000 | 40.3 | 15 | 9.62 | 0.56 | 0.8 | 68.0 |
| 500 | 1000 | 26.9 | 30 | 10.31 | 0.26 | 1.0 | 85.1 |
| 500 | 1000 | 13.4 | 45 | 10.82 | 0.15 | 5.1 | 91.4 |
| 500 | 1000 | 0 | 60 | 11.13 | 0.14 | 21.2 | 92.0 |

The leaching time in each leaching step shall be so long that a sufficient leaching out of aluminium and fluorine is obtained. No definite time can be set as the result is temperature dependent, whereby high temperatures give shorter leaching times. Thus if a satisfactory result is obtained after 1 hr at 70° C., the same result can be obtained after 15 min at 90° C. However, the normal leaching times are 1 to 3 hrs, but can be longer if an extremely high quality is desired. Long leaching times are, however, costly in that the equipment is thereby over-occupied.

The leaching process can be carried out as a batch-wise process, as well as a continuous process using known technique.

We claim:

1. A method for producing substantially pure silica from waste silica obtained when producing aluminium fluoride from hexafluosilicic acid and aluminium hydroxide, characterized in that silica being contaminated with aluminium and fluorine, is provided, in a first, aqueous slurry, with hydrogen ions to a final pH of below 3, and leached at a temperature of 20°-100° C. for a time sufficient to leach out substantially all aluminium and part of fluorine present, whereupon the insoluble silica is isolated, and then slurried in a second, aqueous slurry, whereupon hydroxyl ions or hydroxyl ions forming compounds are provided to a pH of 8.5-11.5, and the silica is further leached at a temperature of 20°-100° C. for a time sufficient to leach out remaining fluorine, whereupon finally substantially pure silica is isolated, and washed with water.

2. A method according to claim 1, characterized in that the acid leaching takes place at a temperature of above 50.

3. A method according to claim 1, characterized in that the alkaline leaching takes place at a temperature of above 50° C.

4. A method according to claim 1, characterized in that the acidic pH is 0.5-2.0.

5. A method according to claim 1, characterized in that the alkaline pH is 9.5-10.5.

6. A method according to claim 1, characterized in that the first silica waste slurry is prepared from scrubber water or a mixture of mother liquor and scrubber water obtained in the said production of aluminium fluoride.

7. A method according to claim 1, which further comprises washing the isolated insoluble silica with water.

8. A method according to claim 2, characterized in that the acid leaching takes place at a temperature of above 70° C.

9. A method according to claim 3, characterized in that the alkaline leaching takes a place at a temperature of 60°-90° C.

* * * * *